United States Patent
Lu et al.

(10) Patent No.: US 12,293,092 B2
(45) Date of Patent: May 6, 2025

(54) METHOD AND APPARATUS FOR MANAGING MEMORY

(71) Applicants: Advanced Micro Devices, Inc., Santa Clara, CA (US); ATI Technologies ULC, Markham (CA)

(72) Inventors: Lu Lu, Beijing (CN); Anthony Asaro, Markham (CA); Yinan Jiang, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 98 days.

(21) Appl. No.: 18/083,306

(22) Filed: Dec. 16, 2022

(65) Prior Publication Data

US 2024/0201876 A1    Jun. 20, 2024

(51) Int. Cl.
*G06F 3/06* (2006.01)

(52) U.S. Cl.
CPC .......... *G06F 3/0625* (2013.01); *G06F 3/0644* (2013.01); *G06F 3/0673* (2013.01)

(58) Field of Classification Search
CPC ..... G06F 3/0625; G06F 3/0644; G06F 3/0673
See application file for complete search history.

(56) References Cited

U.S. PATENT DOCUMENTS

| | | |
|---|---|---|
| 6,414,992 B1 | 7/2002 | Sriram et al. |
| 7,234,139 B1 | 6/2007 | Feinberg |
| 8,201,732 B1 | 6/2012 | Kropf et al. |
| 8,490,868 B1 | 7/2013 | Kropf et al. |
| 8,776,060 B2 | 7/2014 | Jess et al. |
| 9,626,313 B2 | 4/2017 | Acharya |
| 9,940,123 B1 | 4/2018 | Ayoub et al. |
| 10,055,234 B1 | 4/2018 | Rao |
| 2004/0117793 A1 | 6/2004 | Shaylor |
| 2005/0081212 A1 | 4/2005 | Goud et al. |
| 2006/0215659 A1 | 9/2006 | Rothman et al. |
| 2008/0082745 A1 | 4/2008 | Takada et al. |
| 2008/0092745 A1 | 4/2008 | Tsao et al. |
| 2009/0113422 A1 | 4/2009 | Kani et al. |

(Continued)

FOREIGN PATENT DOCUMENTS

| | | |
|---|---|---|
| JP | 2004522234 T2 | 7/2004 |
| JP | 2012220990 A2 | 11/2012 |

OTHER PUBLICATIONS

Barham, P., et. al., "Xen and the Art of Virtualization", SOSP '03: Proceedings of the nineteenth ACM Symposium on Operating Systems Principles, ACM, Bolton Landing, New York, Oct. 19, 2003, 14 pgs.

*Primary Examiner* — Yong J Choe
(74) *Attorney, Agent, or Firm* — Volpe Koenig (57) ABSTRACT

A method and apparatus of managing memory includes storing a first memory page at a shared memory location in response to the first memory page including data shared between a first virtual machine and a second virtual machine. A second memory page is stored at a memory location unique to the first virtual machine in response to the second memory page including data unique to the first virtual machine. The first memory page is accessed by the first virtual machine and the second virtual machine, and the second memory page is accessed by the first virtual machine and not the second virtual machine.

20 Claims, 5 Drawing Sheets

(56) References Cited

U.S. PATENT DOCUMENTS

| | | |
|---|---|---|
| 2009/0182967 A1 | 7/2009 | Cardona et al. |
| 2010/0125914 A1 | 5/2010 | Dandekar et al. |
| 2010/0306773 A1 | 12/2010 | Lee et al. |
| 2011/0029821 A1 | 2/2011 | Chow et al. |
| 2011/0078791 A1 | 3/2011 | Prakash et al. |
| 2011/0131447 A1 | 6/2011 | Prakash et al. |
| 2011/0151836 A1 | 6/2011 | Dadu et al. |
| 2011/0154023 A1 | 6/2011 | Smith et al. |
| 2011/0179415 A1 | 7/2011 | Donnellan et al. |
| 2011/0261885 A1 | 10/2011 | de Rivaz |
| 2012/0017271 A1 | 1/2012 | Smith et al. |
| 2012/0084774 A1 | 4/2012 | Post et al. |
| 2012/0102491 A1 | 4/2012 | Maharana |
| 2012/0117555 A1 | 5/2012 | Banerjee et al. |
| 2012/0117562 A1* | 5/2012 | Jess .......... G06F 9/45558 718/1 |
| 2012/0179932 A1 | 7/2012 | Armstrong et al. |
| 2012/0180046 A1 | 7/2012 | Jacobs et al. |
| 2012/0210332 A1 | 8/2012 | Zhao et al. |
| 2012/0254865 A1 | 10/2012 | Saeki et al. |
| 2012/0291021 A1 | 11/2012 | Banerjee et al. |
| 2013/0007323 A1 | 1/2013 | Arges et al. |
| 2013/0097244 A1 | 4/2013 | Manley et al. |
| 2013/0016002 A1 | 6/2013 | Graham et al. |
| 2013/0159686 A1 | 6/2013 | Graham et al. |
| 2013/0174144 A1 | 7/2013 | Cheng et al. |
| 2014/0108776 A1 | 4/2014 | Miyauchi et al. |
| 2014/0229769 A1 | 8/2014 | Abraham et al. |
| 2014/0237469 A1 | 8/2014 | Tsirkin |
| 2014/0297405 A1 | 10/2014 | Fine |
| 2015/0128136 A1 | 5/2015 | Rafique et al. |
| 2015/0293776 A1 | 10/2015 | Persson et al. |
| 2016/0205069 A1 | 7/2016 | Blocher et al. |
| 2016/0292007 A1 | 10/2016 | Ding et al. |
| 2016/0328255 A1 | 11/2016 | Dow et al. |
| 2017/0277554 A1 | 9/2017 | Oehrlein et al. |
| 2018/0288133 A1 | 10/2018 | Colenbrander |
| 2018/0293692 A1 | 10/2018 | Koker |
| 2018/0293776 A1 | 10/2018 | Ray et al. |
| 2018/0295375 A1 | 10/2018 | Ratner |
| 2019/0018699 A1 | 1/2019 | Asaro et al. |
| 2019/0220301 A1 | 7/2019 | Zheng et al. |
| 2022/0058048 A1 | 2/2022 | Jiang et al. |

\* cited by examiner

METHOD AND APPARATUS FOR MANAGING MEMORY

BACKGROUND

In cloud data center systems, graphics processor unit (GPU) virtualization techniques such as single root input/output (I/O) virtualization (SRIOV) is utilized to support multiple users in order to increase the server utilization and reduce the cost. Improvements to such techniques are constantly being made.

BRIEF DESCRIPTION OF THE DRAWINGS

A more detailed understanding can be had from the following description, given by way of example in conjunction with the accompanying drawings wherein.

DETAILED DESCRIPTION

It is possible for virtual machines to share the same graphics processing unit (GPU). Additionally, it is possible for different virtual machines to be executing the same application. Typically, such an application loads data into memory that does not vary based on which virtual machine that application is executing on. Examples of such data include graphics textures, vector data, or any other data that could be loaded into a GPU memory. Sharing common data for different virtual machines, by deduplicating that data and having the different virtual machines each point to the same data stored in physical memory, can reduce the total memory footprint. Reducing the total memory footprint may alleviate the device dynamic random access memory (DRAM) capacity pressure, as the repetitive loading of the same data on the server system is reduced, which increases efficiency and reduces power requirements.

A method of managing memory includes storing a first memory page at a shared memory location in response to the first memory page including data shared between a first virtual machine and a second virtual machine. A second memory page is stored at a memory location unique to the first virtual machine in response to the second memory page including data unique to the first virtual machine. The first memory page is accessed by the first virtual machine and the second virtual machine, and the second memory page is accessed by the first virtual machine and not the second virtual machine.

An apparatus for managing memory includes a memory, and a processor operatively coupled to and in communication with the memory. The processor is configured to, in response to a first memory page including data shared between a first virtual machine and a second virtual machine, store the first memory page at a shared memory location. The processor is configured to, in response to a second memory page including data unique to the first virtual machine, store the second memory page at a memory location unique to the first virtual machine. The processor is configured to access the first memory page by the first virtual machine and the second virtual machine, and access the second memory page by the first virtual machine and not the second virtual machine.

A non-transitory computer-readable medium for managing memory, the non-transitory computer-readable medium having instructions recorded thereon that, when executed by the processor, cause the processor to perform operations. The operations include storing a first memory page at a shared memory location in response to the first memory page including data shared between a first virtual machine and a second virtual machine. A second memory page is stored at a memory location unique to the first virtual machine in response to the second memory page including data unique to the first virtual machine. The first memory page is accessed by the first virtual machine and the second virtual machine, and the second memory page is accessed by the first virtual machine and not the second virtual machine.

Figure 1:
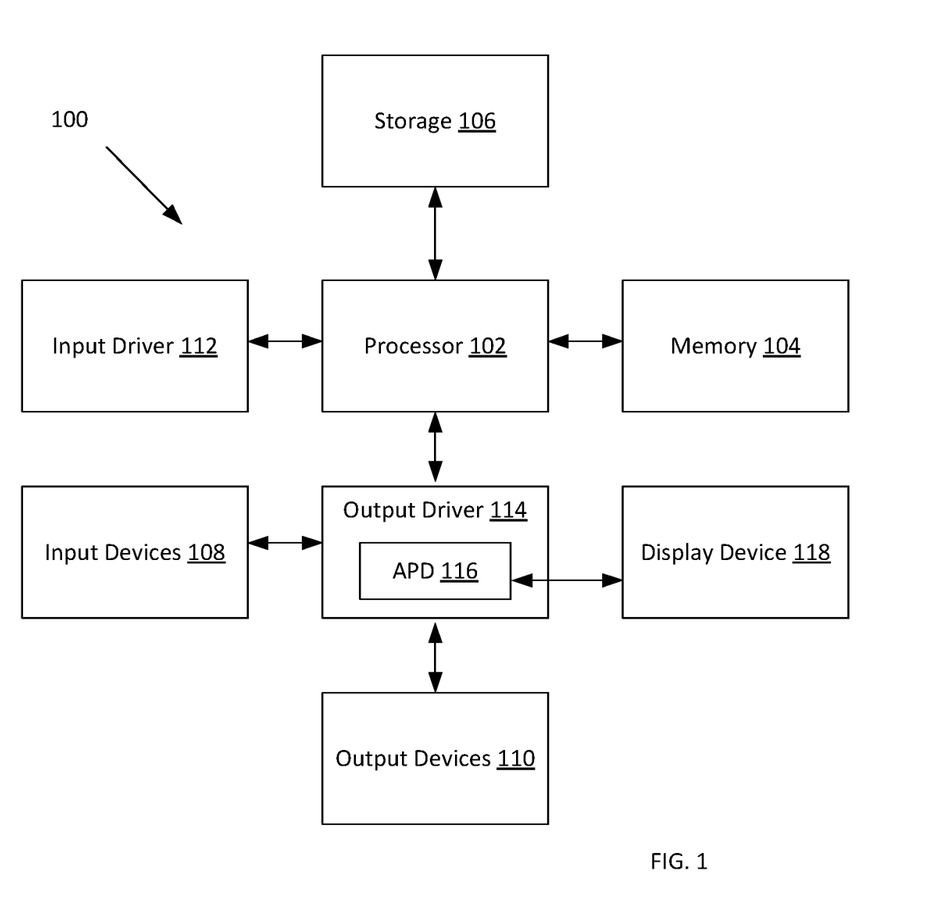
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 may manage an accelerated processing device ("APD") 116 which is coupled to a display device 118. In some examples, the APD 116 is a graphics processing unit ("GPU"). The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein. The APD 116 includes an APD memory 117, which is a general purpose memory used by the units of the APD 116, including the compute units 132, the SIMD units 138, the command processor 136, or other units of the APD 116. The APD memory 117 is separate from the system memory 104. In some examples, the physical addresses of the APD memory 117 are a different address space than the physical addresses of the memory 104. In an example, addresses have numerical address values and a physical memory identifier. The physical memory identifier references the system memory 104 or the APD memory 117. The same numerical memory address can thus refer to either a portion of the system memory 104 or to a portion of the APD memory 117, depending on the physical memory identifier.

The processor 102 is configured to support a virtualizations scheme in which multiple virtual machines execute on the processor 102. Each virtual machine ("VM") "appears" to software executing in that VM as a completely "real" hardware computer system, but in reality comprises a virtualized computing environment that may be sharing the device 100 with other virtual machines. Virtualization may be supported fully in software, partially in hardware and partially in software, or fully in hardware. The APD 116 supports virtualization, meaning that the APD 116 can be shared among multiple virtual machines executing on the processor 102, with each VM "believing" that the VM has full ownership of a real hardware APD 116. For virtualization, VMs take turns executing on the processor 102. A switch from one VM to another may be referred to as a "virtualization context switch". Alternatively, each VM may execute on its own dedicated processor.

Figure 2:
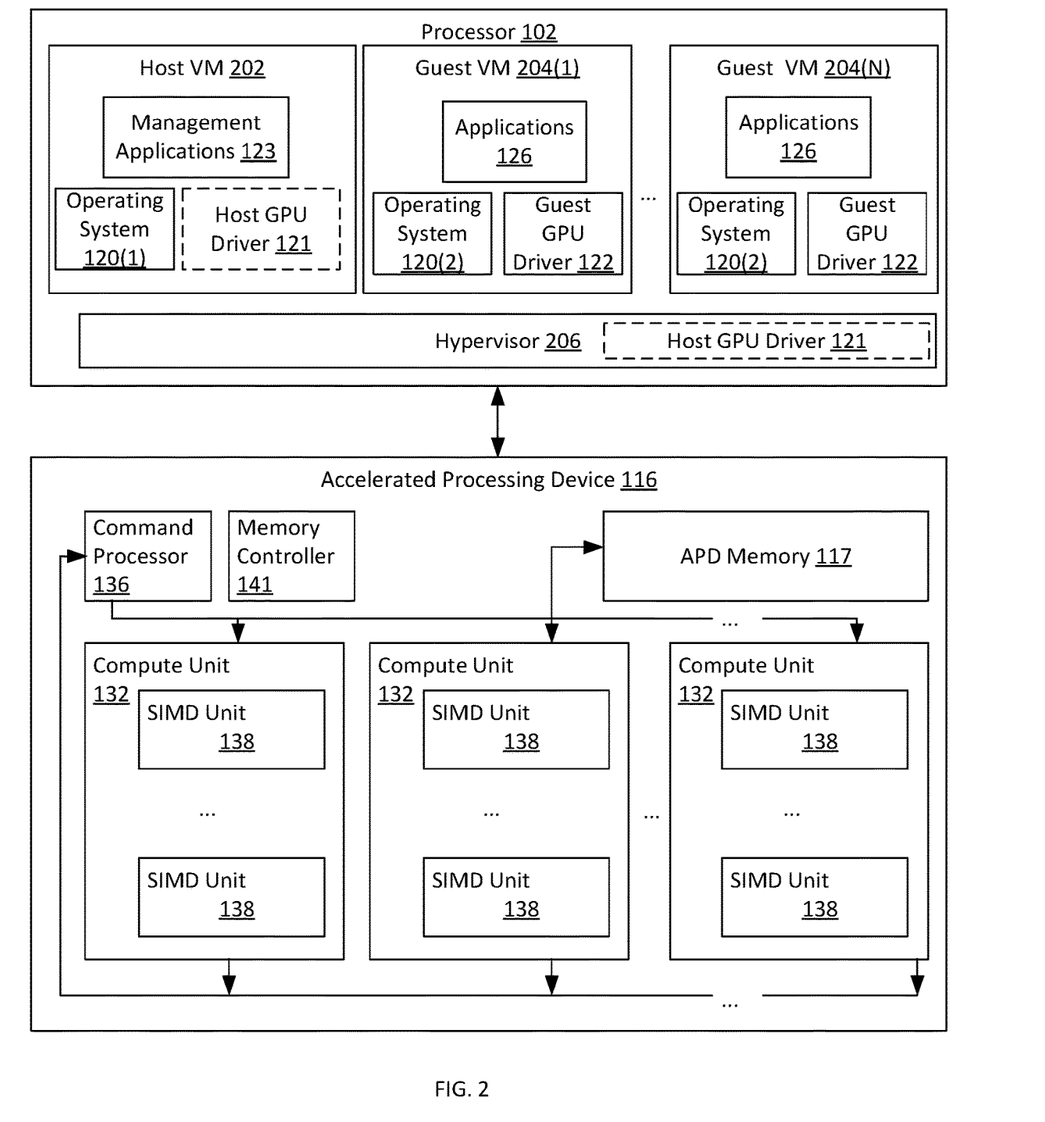
FIG. 2 is a block diagram of the device of FIG. 1, illustrating additional detail.

FIG. 2 illustrates details of the device 100 and the APD 116 related to virtualization, according to an example. The processor 102 supports multiple virtual machines. A specialized host virtual machine 202, is not a "general purpose" VM like the guest VMs 204, but instead performs support for virtualization of the APD 116 for use by the guest VMs 204. A hypervisor 206 provides virtualization support for the virtual machines, which includes a wide variety of functions such as managing resources assigned to the virtual machines, spawning and killing virtual machines, handling system calls, managing access to peripheral devices, managing memory and page tables, and various other functions.

The APD 116 supports virtualization by allowing time-based or spatial partitioning of the APD 116 between the virtual machines. In time-based sharing, the sharing of the APD 116 among the different virtual machines is accomplished by time-dividing the operations of the APD 116 amongst the different virtual machines. A virtualization scheduler 212 performs this task, scheduling different virtual machines for operation by switching between work for the different virtual machines as the execution time assigned to the virtual machines elapse. In spatial partitioning, a dedicated processing resource (e.g., one or more compute units 132) is assigned for each virtual machine executing simultaneously. Although the APD 116 is shared among the different virtual machines, each virtual machine perceives that it has an individual instance of a real, hardware APD 116.

The host VM 202 and the guest VMs 204 have operating systems 120. The host VM 202 has management applications 123 and a GPU virtualization driver 121. The guest VMs 204 have applications 126, an operating system 120, and a GPU driver 122. These elements control various features of the operation of the processor 102 and the APD 116.

As stated above, the host VM 202 configures aspects of virtualization in the APD 116 for the guest VMs 204. Thus the host VM 202 includes an operating system 120 that supports execution of other elements such as management applications 123 and a GPU virtualization driver 121. The GPU virtualization driver 121 is not a traditional graphics driver that simply communicates with and sends graphics rendering (or other) commands to the APD 116, without understanding aspects of virtualization of the APD 116. Instead, the GPU virtualization driver 121 communicates with the APD 116 to configure various aspects of the APD 116 for virtualization. In one example, the GPU virtualization driver 121 manages parameters related to the time-slicing mechanism (or spatial partitioning mechanism) for sharing the APD 116 among the different VMs, controlling parameters such as how much time is in each time-slice, how switching is performed between different virtual functions, and other aspects, or for spatial partitioning, which resources are utilized by different VMs in parallel. The GPU virtualization driver 121 may be separate from a different graphics driver that does send graphics-related commands to the APD 116 or may be incorporated into such a graphics-related driver. In other words, the virtualization-related functionality may be in a separate driver than graphics functionality or may be included in a single driver with the graphics functionality. The management applications 123 perform one or more tasks for managing virtualization and/or that involve data from two or more different guest VMs 204.

The guest VMs 204 include an operating system 120, a GPU driver 122, and applications 126. The operating system 120 is any type of operating system that could execute on processor 102. The GPU driver 122 is a "native" driver for the APD 116 in that the GPU driver 122 controls operation of the APD 116 for the guest VM 204 on which the GPU driver 122 is running, sending tasks such as graphics rendering tasks or other work to the APD 116 for processing. The native driver may be an unmodified or only slightly modified version of a device driver for a GPU that would exist in a bare-metal non-virtualized computing system.

Although the GPU virtualization driver 121 is described as being included within the host VM 202, in other implementations, the GPU virtualization driver 121 is included in the hypervisor instead 206. In such implementations, the host VM 202 may not exist and functionality of the host VM 202 may be performed by the hypervisor 206.

The operating systems 120 of the host VM 202 and the guest VMs 204 perform standard functionality for operating systems in a virtualized environment, such as communicating with hardware, managing resources and a file system, managing virtual memory, managing a network stack, and many other functions. The GPU driver 122 controls operation of the APD 116 for any particular guest VM 204 by, for example, providing an application programming interface ("API") to software (e.g., applications 126) to access various functionality of the APD 116. In some examples, the driver 122 also includes a just-in-time compiler that compiles programs for execution by processing components (such as the SIMD units 138 discussed in further detail below) of the APD 116. For any particular guest VM 204, the GPU driver 122 controls functionality on the APD 116 related to that guest VM 204, and not for other VMs.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. A command processor 136 accepts commands from the processor 102 (or another source), and delegates tasks associated with those commands to the various elements of the APD 116 such the compute units 132 and, optionally a graphics processing pipeline that performs graphics rendering.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A command processor 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline (e.g., custom operations performed to supplement processing performed for operation of the graphics pipeline). An application 126 or other software executing on the processor 102 transmits programs that define such computation tasks to the APD 116 for execution.

Virtualization on the APD 116 works as follows. The virtualization scheduler 212 manages time-slices or spatial partitioning on the APD 116 for the VMs (both the host VM 202 and the guest VMS 204) that share the APD 116. For time-based partitioning, the virtualization scheduler 212 tracks the time-slices, stopping work on the APD 116 when a time-slice for a particular VM has expired and starting work for the VM having the next time-slice. Thus, the virtualization scheduler 212 switches between different VMs that have work to be executed on the APD 116. For spatial partitioning, the virtualizations scheduler 212 schedules operations for execution in the different resources of the APD 116 as needed by the different virtual machines 204.

In some examples, the other portions of the APD 116 whose functionality is not specifically described in the context of virtualization works as described above and as if no virtualization was occurring. For example, the graphics processing pipeline performs operations related to graphics rendering in response to graphics rendering commands fetched by the command processor 136. For at least some of the graphics rendering commands associated with the graphics processing pipeline, and/or for the general purpose compute operation, command processor 136 generates and manages wavefronts for execution on the SIMD units 138 of the compute units 132 in accordance with the commands dispatched by the command processor 136. In an example a command is a command to render a particular piece of geometry using, among other facilities of the graphics processing pipeline, a particular pixel shader program.

As described above, multiple virtual machines may be operating on the system 100. Data that the multiple virtual machines utilize within the APD memory 117 may include data unique to each virtual machine or common data that is shared among virtual machines. In order to keep common and unique data separate, a region (e.g., physical memory area) or regions for storing shared data may be utilized separate from a region, or regions, for storing data unique to particular guests.

Regarding memory address spaces, the following memory address spaces exist: a system physical address space, guest physical address spaces, and guest virtual address spaces. The system physical address space is the physical address space of the device 100 itself. The guest physical address spaces are the virtualized physical address spaces that "belong" to each virtual machine. Virtual machines mostly treat these guest physical address spaces as the physical address spaces of the virtual machines. Guest virtual address spaces are the virtual address spaces of the virtual machines that are mapped to the guest physical addresses of the virtual machines 204. The hypervisor 206 manages system physical memory as well as guest physical memory-to-system physical memory mappings. The guest virtual machines 204 manage guest virtual memory-to-guest physical memory mappings.

It is possible for system physical addresses to be within system memory 104 or APD memory 117. Regarding system physical addresses within the APD 116, the APD 116 includes a memory controller 141 that handles address translations between guest physical addresses and system physical addresses. As part of managing address translations, when the host GPU driver 121 determines that data is to be stored in the APD memory 117 and that data should be accessible to a guest VM 204, the host GPU driver 121 informs the memory controller 141 of memory address mappings between guest physical addresses for that VM 204 and system physical addresses of the data in the APD memory 117. The host GPU driver 121 or another entity (e.g., the hypervisor 206, a hardware entity, or another entity) stores that data within the APD memory 117. Upon receiving memory access requests that target the APD memory 117, where the memory access requests specify guest physical memory addresses, the memory controller 141 utilizes these mappings to translate the guest physical addresses into system physical addresses and performs the requested memory accesses with the translated system physical addresses. In this document, it is sometimes stated that the hypervisor 206 performs memory management actions and it is sometimes said that the host GPU driver 121 performs such memory management actions. Such statements should be taken to be equivalent—i.e., these statements should be taken to understand that a component of the hypervisor 206, such as a host GPU driver 121 or other entity, performs certain actions to manage memory address translations or other related operations.

Regarding memory pages having physical memory addresses that are considered shared between multiple guest VMs 204 and that are stored within the APD memory 117, the hypervisor manages placement of such memory pages within the APD memory 117 and also stores address translations from guest physical addresses to system physical addresses into the memory controller 141. For such memory pages, the guest GPU driver 122 manages translations between guest virtual addresses and guest physical addresses.

In some examples, applications 126 executing in a guest VM 204 indicate to the guest GPU driver 122 which data that is to be stored in APD memory 117 is to be shared between guest virtual machines 204. In other words, the applications 126 indicate which data is to be stored in APD memory 117 and whether that data is to be stored as common (shared between guest VMs 204) or not common (not shared between guest VMs 204). The application 126 provides such information to the guest GPU driver 122. The guest GPU driver 122 identifies corresponding guest physical addresses, and stores such data into memory using the guest physical addresses, if that data is not already stored. In addition, in some instances, the guest GPU driver 122 informs the hypervisor that the stored data can be shared. In response to the guest GPU driver 122 storing such data, the hypervisor (e.g., the host GPU driver 121) identifies corresponding system physical memory pages for the data, and stores corresponding translations into the memory controller 141. If the guest GPU driver 122 indicates that the data can be shared, the hypervisor stores such pages in shared memory.

In summary, an application 126 indicates which data is to be considered common, a guest GPU driver 122 stores that data into memory using a corresponding set of guest physical addresses (and stores the translations from guest virtual to guest physical), and the hypervisor 206 identifies physical memory pages for the data and stores corresponding translations into the memory controller 141.

In addition to the above, in some instances, once memory pages are shared between the guest VMs 204, the memory pages cannot be written to. Thus, the hypervisor 206 sets the address translations in the memory controller 141 of the APD 116 to indicate that shared memory pages are read-only. A write to such memory pages by a guest VM 204 will result in an error, and/or the write will not occur. The memory controller 141 controls access permissions for memory pages within the APD memory 117. For example, the memory controller 141 can set memory pages to be read-only, read-write, or to have other access permissions. In some examples, it is possible for shared pages to be written to by one or more of the guest VMs 204 that share those pages.

In the event that an application 126 executing on a first guest VM 204 requests common data, where that same application executing on a second guest VM 204 has already loaded that common data, the hypervisor 206 does not need to (and in fact does not) load that data into memory. Instead, the hypervisor 206 simply sets the guest physical addresses of the first guest VM 204 to point to the system physical addresses already loaded by the application 126 on the second guest VM 204. In some examples, this elision of load is performed by the guest GPU driver 122. More specifically, the guest GPU driver 122 asks the hypervisor 206 to identify which data has been loaded. If the GPU driver 122 determines that data requested by an application 126 to be loaded has already been loaded, then the host GPU driver 121 simply maps the guest physical addresses to the system physical addresses that correspond to the loaded data, and the guest GPU driver 122 does not request that data to be stored into the APD memory 117.

There are two modes in which various elements of the device 100 can load shared data into the APD memory 117. In one mode, an application 126 includes a listing of data (e.g., a block of data or a set of blocks of data) that is to be stored into shared memory. Upon initialization for that data (e.g., upon application startup), the application 126 indicates this listing of data to the guest GPU driver 122. The GPU driver 122 generates mappings from guest virtual addresses to guest physical addresses for such data and indicates to the hypervisor 206 that the data in the listing should be stored into the APD memory 117. The hypervisor 206 checks whether that data has already been stored in the APD memory 117 by a different guest VM 204 (e.g., running the same application 126). If the data has already been stored in the APD memory 117, then the hypervisor 206 identifies the system physical addresses of that data, maps the guest physical addresses from the GPU driver 122 to the identified system physical addresses, and places those mappings into the memory controller 141. The hypervisor 206 or guest does not need to (and does not) store the data from the listing into memory because that data is already stored in the APD memory 117. If the data has not already been stored in the APD memory 117, then the hypervisor generates the guest physical to system physical address mappings, stores those mappings into the memory controller 141, and stores the data in the listing into the APD memory 117, with the mappings pointing to that data. In some implementations, the determining of whether or not to store the data in memory is performed by a guest GPU driver 122 rather than the hypervisor 206.

In another mode of operation, an application 126 performs accesses for shared data on an ongoing basis. In this mode of operation, the application 126 does not necessarily request a fixed amount of shared data to be loaded upon initialization or some other fixed time, but instead loads data on an ongoing basis. In this second mode of operation, the application 126 may load some, all, or none of the common data during execution. Further, the data that is loaded can be loaded at varying times on different instances of execution of the application 126 in different VMs 204. For instance, a first guest VM 204 may load first data before second data and a second guest VM 204 may load the second data before the first data. To accommodate this mode of operation, the application 126 includes unique identifiers of data that is to be loaded into the APD memory 117. Each unique identifier uniquely identifies an item of data so that two instances of an applications 126 executing on different VMs 204 can identify the same data despite being loaded at different times. The hypervisor maintains a list that correlates unique identifiers and guest physical addresses with system physical addresses. In other words, the hypervisor 206 knows, for every combination of guest physical address and unique identifier, which range of system physical addresses corresponds to that combination. For loading, in response to a request to load data that includes a guest physical address and a unique identifier, the hypervisor 206 determines whether that same data is stored in the APD memory 117 by determining whether the hypervisor 206 has already loaded data with that unique identifier into the APD memory 117. If the hypervisor 206 has already loaded that data, then the hypervisor 206 maps the guest physical addresses to the system physical addresses associated with the unique identifier. The guest VM 204 can simply access that data using guest virtual addresses, since a mapping has been created between the guest virtual addresses and guest physical addresses, as well as mappings between the guest physical addresses and the system physical addresses. If the hypervisor 206 has not loaded that data, then the hypervisor 206 loads that data at a system physical memory address of the APD memory 117 and "remembers" that the unique identifier refers to that system physical memory address.

In this way, memory capacity, bandwidth, power as well as loading time of the common data can be saved for each guest if the requested data is already being loaded into the GPU frame buffer. At the same time, the common data is protected from any guest VM 204 maliciously tampering by having the host GPU driver 121 control the secondary level page's mapping and permissions for the guests. In various examples, shared pages are read-only or are read/write.

Figure 3:
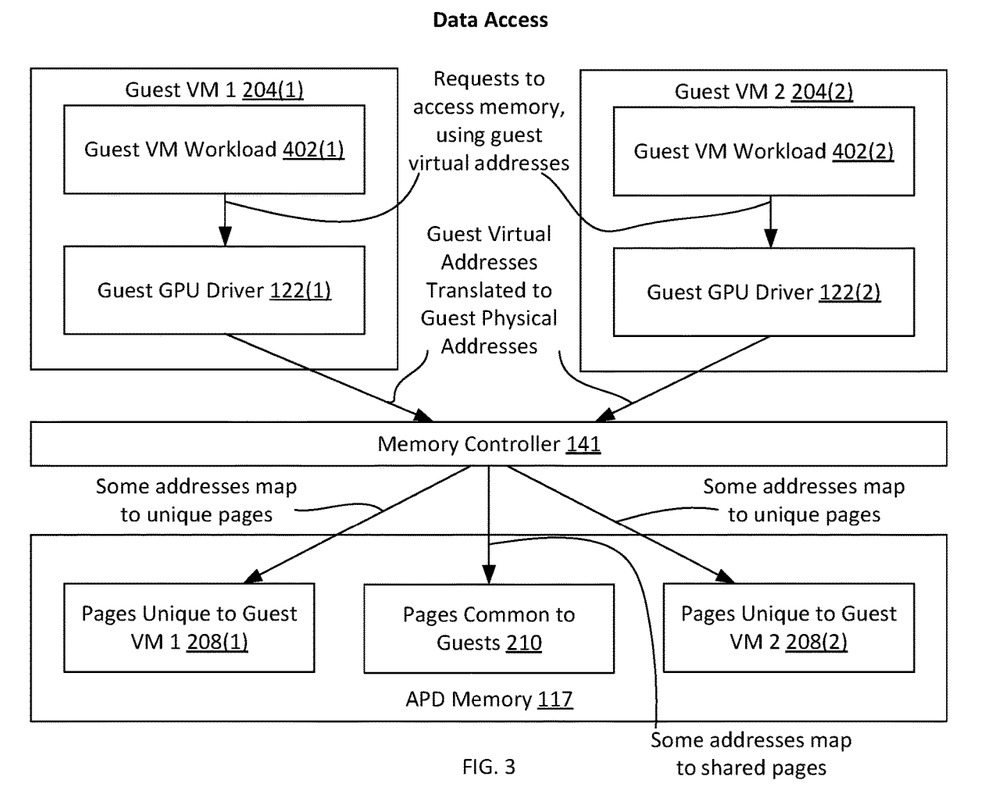
FIG. 3 is a block diagram illustrating memory accesses, according to an example.

FIG. 3 is an example schematic block diagram of guest device workload data management. FIG. 3 illustrates a host 304, guest VM 1 204(1), guest VM 2 204(2), and APD memory 117. The guest VM 1 204(1) executes a guest VM workload 402(1) and a guest GPU driver 122(1) and the guest VM 2 204(2) executes a guest VM workload 402(2) and a guest GPU driver 122(2). In various examples, the guest VM workloads 402 are applications 126, and in other examples, the guest VM workloads 402 are any other entity.

The guest VM workloads 402 make requests to access memory using guest virtual addresses. The guest GPU driver 122 translates the guest virtual addresses to guest physical addresses. The guest GPU driver 122 forwards these access requests with the translated guest physical addresses to the APD 116 to perform the requested accesses. As described above, the memory controller 141 of the APD 116 has the ability to translate addresses from guest physical address to system physical address for addresses within the APD memory 117. Thus, in response to receiving requests to access memory that specify guest physical addresses, the memory controller 141 translates the guest physical addresses into system physical addresses and causes the accesses to occur. Because the hypervisor 206 has mapped some guest physical addresses to system physical addresses that are shared or common, some such accesses reference pages common to guests 210. It is possible for accesses from both guest VMs 204 to make memory access requests that ultimately target the pages common to the guests 210. In addition, some memory pages are unique to the guest VMs 204. Only accesses from a particular VM 204 can reference the pages unique to a guest 208. For example, accesses made by guest VM 1 204(1) cannot reference pages unique to guest VM 2 208(2) and accesses made by guest VM 2 204(2) cannot reference pages unique to guest VM 1 208(1).

Figure 4A:
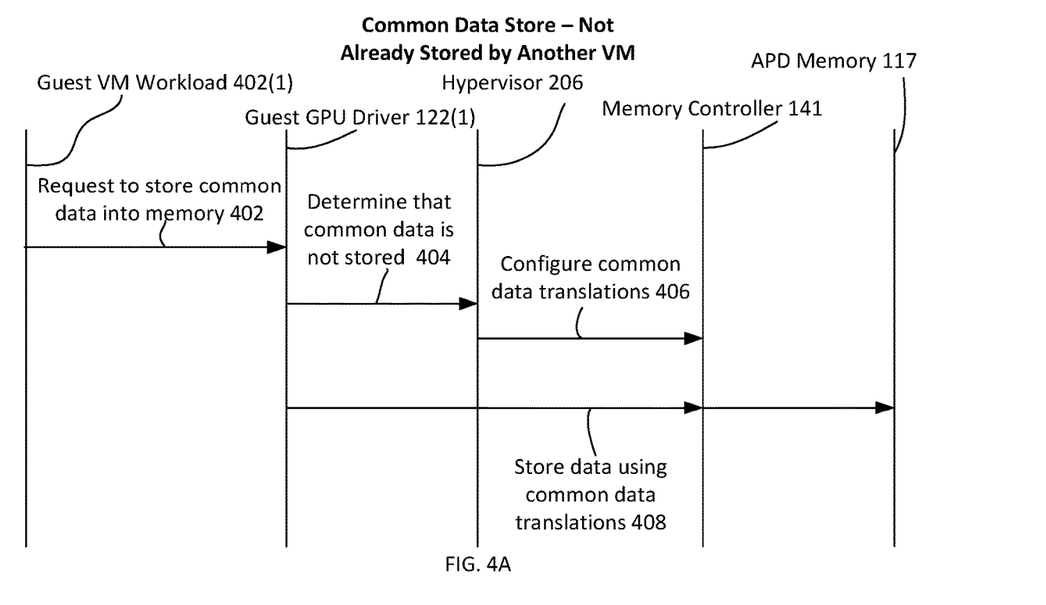
FIGS. 4A-4B are example diagrams illustrating storing common data.
Figure 4B:
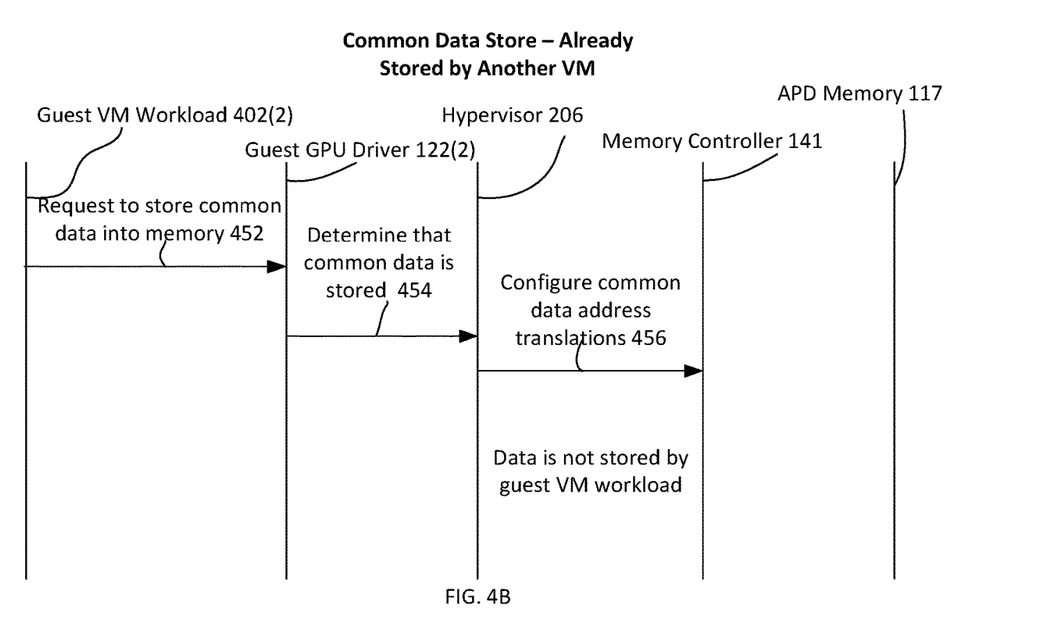

FIGS. 4A and 4B illustrate operations for storing common data into memory, according to examples. In FIG. 4A, a virtual machine 204 requests common data to be stored into the APD memory 117, where that data has not yet already been stored into the APD memory 117. In this scenario, the guest VM workload 402(1) (e.g., an application 126) requests or specifies common data that is to be stored as common data within the APD memory 117. The guest VM workload 402(1) transmits that request 402 to the guest GPU driver 122(1). The guest GPU driver 122(1) transmits the request 402 to the hypervisor which then configures the common data translations 406. The guest GPU driver 122(1) determines whether the data requested to be stored as common data has already been stored in the APD memory 117 by a different guest VM 204. In the example of FIG. 4A, the data is not already stored by another VM at operation 404. In this instance, the hypervisor configures the common data translations 406 in the memory controller 141 and the guest GPU driver 122(1) stores the common data using the common data translations at operation 408. The common data is stored in memory pages designated as common by the hypervisor 206. As shown in FIG. 4B, when a different VM 204 requests the same data be stored as common data, a hypervisor generates mappings between the guest physical memory pages of that different VM 204 to the common memory pages, but that different VM 204 does not store the common data, since that data is already stored.

In FIG. 4B, a guest VM workload 402(2) requests to the guest GPU driver 122(2) to store common data into memory 452. The guest GPU driver 122(2) determines that the common data is already stored in the APD memory 117 454. In an example, the guest GPU driver 122(2) makes this determination based on information reported by the hypervisor 206 to the guest GPU driver 122(2). The guest GPU driver 122(2) requests the hypervisor 206 to generate the translations between guest physical address and system physical address. The hypervisor 206 generates these translations, with the system physical addresses being the addresses of the common data already stored in the APD memory 117. The hypervisor 206 configures the APD memory controller 141 with such address translations at operation 456. The guest GPU driver 122(2) does not request the data be stored into the APD memory 117, as the data at issue is already stored in the APD memory 117.

As described above, in some situations, the guest VM workload 402(1) does not provide a specific identifier for different resources. The hypervisor 206 knows which system physical memory addresses correspond to the common data based on the application identifier and stores the common data upon initialization of the guest VM workload 402 or at another time. In other situations, the guest VM workload 402(1) does provide a specific identifier for different resources, since the guest VM workload 402(1) makes requests to store common data at varying times. The hypervisor 206 knows which common data stored in the APD memory 117 to map to any particular request to store data based on this unique identifier for each resource.

Figure 5:
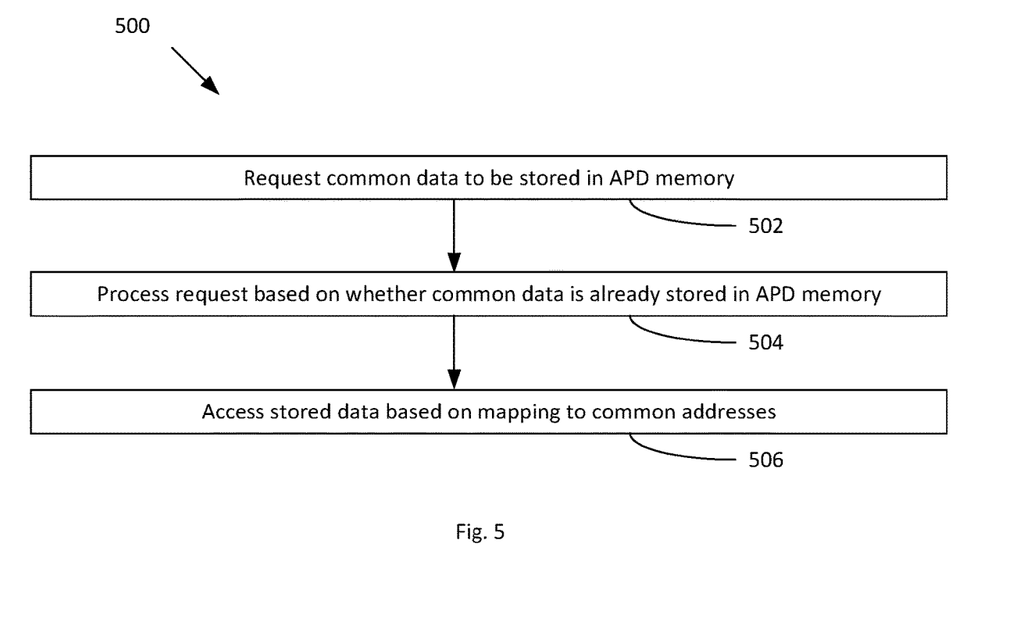
FIG. 5 is a flow diagram of an example method for managing data resources in a shared application, according to an example.

FIG. 5 is a flow diagram of a method 500 for accessing data stored in APD memory 117 that is shared between virtual machines 204, according to an example. Although described with respect to the system of FIGS. 1-4B, those of skill in the art will understand that any system configured to perform the steps of the method 500 in any technically feasible order falls within the scope of the present disclosure.

At step 502, a guest VM workload requests that common data is stored in an APD memory 117. As described elsewhere herein, in some examples, the workload indicates a single block of data to be stored in a common location. In such instances, the workload does not need to include a separate identifier, and the hypervisor is able to associate the same block of data with other instances of the same workload executing in a different virtual machine 204. In other examples, the workload makes such requests multiple times at runtime. In such examples, the workload includes a unique identifier for each request to store data. The hypervisor 206 is able to associate the requests to store data with the actual data stored in the APD memory 117 and the associated system physical addresses.

At step 504, the guest GPU driver 122 and hypervisor 206 process the request based on whether the common data requested to be stored is already stored in the APD memory 117. If the common data is already stored, then the hypervisor 206 associates the guest physical memory pages provided by the guest GPU driver 122 with the system physical memory pages of the already stored common data. If the common data is not already stored, then the hypervisor performs this action, and additionally causes the common data to be stored at those memory pages. For example, the guest GPU driver 122 requests the APD 116 store the data using guest physical memory pages and the memory controller 141 of the APD 117 translates the guest physical memory pages to system physical memory pages in the APD memory 117 and stores the data at those system physical memory pages.

At step 506, a guest VM workload accesses stored data based on a mapping to common addresses. More specifically, a guest VM performs a memory access, where the memory access points to data in the APD 116 that is shared between VMs 204. For this access, the guest VM 204 translates the guest virtual addresses referenced by the access to guest physical addresses and provides those guest physical addresses to the APD 116 to execute the memory access. Because the hypervisor 206 has set the mappings in the APD 116 to map the guest physical addresses to system physical addresses of shared memory pages in the APD memory 117, the access results in an access to those shared memory pages. It should be understood that for shared memory pages, different guest physical addresses on different virtual machines 204 would map to the same, shared system physical addresses within the APD memory 117.

It should be understood that although the shared pages are described as being stored in the APD memory 117, it is possible for shared pages to be stored in other locations and/or for shared pages to reference non-memory resources. For example, it is possible for shared memory addresses to point to resources available over peripheral component interconnect express (PCIe).

In addition to the above, guest VM workloads 402 can request access to data that is not shared. In such instances, the memory address mappings from guest virtual to guest physical and from guest physical to system physical will point to addresses that are not shared between virtual machines 204. For such addresses, one VM 204 will be able to access such addresses, but no other VM 204 is able to access such addresses. In the event that a VM 204 requests data be stored at addresses that are not designated as shared, the hypervisor 206 generates mappings (guest physical to system physical) for the addresses not designated as shared. The hypervisor will not map guest physical addresses from more than one VM 204 to a memory address not designated as shared. In some examples, memory addresses not designated as shared are referred to as memory or data that is unique to a particular virtual machine.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the command processor 136, the memory controller 141, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for managing memory, the method comprising:
   in response to a first memory page including data shared between a first virtual machine and a second virtual machine, storing the first memory page at a shared memory location, by storing the first memory page at a first system physical memory address designated as common memory that is shared by the first virtual machine and the second virtual machine, wherein the first system physical memory address is associated with the shared memory location;
   in response to a second memory page including data unique to the first virtual machine, storing the second memory page at a memory location unique to the first virtual machine;
   accessing the first memory page by the first virtual machine and the second virtual machine; and
   accessing the second memory page by the first virtual machine and not the second virtual machine.

2. The method of claim 1, further comprising:
   in response to the first memory page including shared data, storing a first mapping between a first guest physical address and the first system physical memory address for the first virtual machine.

3. The method of claim 1, further comprising:
   in response to the first memory page including shared data, storing a first mapping between a second guest physical address and the first physical memory address for the second virtual machine.

4. The method of claim 1, wherein storing the second memory page at a memory location unique to the first virtual machine comprises:
   storing the second memory page at a second system physical memory address designated as unique memory, wherein the second system physical memory address designated as unique memory is associated with the memory location unique to the first virtual machine.

5. The method of claim 4, further comprising:
   in response to the second memory page including data unique to the first virtual machine, storing a first mapping between a third guest physical address and the second system physical memory address for the first virtual machine.

6. The method of claim 1, wherein the first memory page is read-only to the first virtual machine and to the second virtual machine.

7. The method of claim 1, wherein the first virtual machine manages mappings for the first memory page between guest virtual addresses and guest physical addresses.

8. The method of claim 1, wherein a host manages mappings for the first memory page between guest physical addresses and system physical addresses.

9. The method of claim 1, wherein the first virtual machine and the second virtual machine execute a same application.

10. An apparatus for managing memory, comprising:
    a memory; and
    a processor operatively coupled to and in communication with the memory, the processor configured to, in response to a first memory page including data shared between a first virtual machine and a second virtual machine, store the first memory page at a shared memory location, by storing the first memory page at a first system physical memory address designated as common memory that is shared by the first virtual machine and the second virtual machine, wherein the first system physical memory address is associated with the shared memory location, in response to a second memory page including data unique to the first virtual machine, store the second memory page at a memory location unique to the first virtual machine, access the first memory page by the first virtual machine and the second virtual machine, and access the second memory page by the first virtual machine and not the second virtual machine.

11. The apparatus of claim 10, wherein the processor is configured to, in response to the first memory page including shared data, store a first mapping between a first guest physical address and the first system physical memory address for the first virtual machine.

12. The apparatus of claim 10, wherein the processor is configured to, in response to the first memory page including shared data, store a first mapping between a second guest physical address and the first physical memory address for the second virtual machine.

13. The apparatus of claim 10, wherein the processor storing the second memory page at a memory location unique to the first virtual machine comprises:
    storing the second memory page at a second system physical memory address designated as unique memory, wherein the second system physical memory address designated as unique memory is associated with the memory location unique to the first virtual machine.

14. The apparatus of claim 13, wherein the processor is configured to, in response to the second memory page including data unique to the first virtual machine, store a first mapping between a third guest physical address and the second system physical memory address for the first virtual machine.

15. The apparatus of claim 10, wherein the first memory page is read-only to the first virtual machine and to the second virtual machine.

16. The apparatus of claim 10, wherein the first virtual machine manages mappings for the first memory page between guest virtual addresses and guest physical addresses.

17. The apparatus of claim 10, wherein a host manages mappings for the first memory page between guest physical addresses and system physical addresses.

18. A non-transitory computer-readable medium for managing memory, the non-transitory computer-readable medium having instructions recorded thereon that, when executed by a processor, cause the processor to perform operations including:
    in response to a first memory page including data shared between a first virtual machine and a second virtual machine, storing the first memory page at a shared memory location, by storing the first memory page at a first system physical memory address designated as common memory that is shared by the first virtual machine and the second virtual machine, wherein the first system physical memory address is associated with the shared memory location;
    in response to a second memory page including data unique to the first virtual machine, storing the second memory page at a memory location unique to the first virtual machine;
    accessing the first memory page by the first virtual machine and not the second virtual machine; and accessing the second memory page by the first virtual machine and not the second virtual machine.

19. The non-transitory computer-readable medium of claim 18, wherein the operations further comprise, in response to the first memory page including shared data, storing a first mapping between a first guest physical address and the first system physical memory address for the first virtual machine.

20. The non-transitory computer-readable medium of claim 18, wherein the operations further comprise, in response to the first memory page including shared data, storing a first mapping between a second guest physical address and the first physical memory address for the second virtual machine.

* * * * *